Jan. 17, 1956 S. W. SPAULDING 2,731,631

CODE CONVERTER CIRCUIT

Filed Oct. 31, 1952 3 Sheets-Sheet 1

INVENTOR.
Spencer W. Spaulding
BY Morris A. Rabkin
ATTORNEY

Jan. 17, 1956 S. W. SPAULDING 2,731,631

CODE CONVERTER CIRCUIT

Filed Oct. 31, 1952 3 Sheets-Sheet 2

INVENTOR.

Spencer W. Spaulding

BY Morris [illegible]

ATTORNEY

Jan. 17, 1956 S. W. SPAULDING 2,731,631

CODE CONVERTER CIRCUIT

Filed Oct. 31, 1952 3 Sheets-Sheet 3

INVENTOR.
Spencer W. Spaulding

BY Morris A. Rabai

ATTORNEY

United States Patent Office 2,731,631

Patented Jan. 17, 1956

2,731,631

CODE CONVERTER CIRCUIT

Spencer W. Spaulding, Haddonfield, N. J., assignor to Radio Corporation of America, a corporation of Delaware Application October 31, 1952, Serial No. 317,871

13 Claims. (Cl. 340—318)

This invention relates to information handling apparatus and to coding devices used therein, and more particularly to a circuit for converting encoded information in digital form to an analogue form in which the characteristics of a signal, such as its amplitude, are representative of the information.

In large scale information handling systems, the information is frequently encoded in digital form to attain versatility in the apparatus required, precise results, and high speed operation. The binary system is one common digital system used for handling numbers and other forms of information. When that system is used, the storage devices and other components of information handling systems are provided with two stable conditions; the existence of one or the other condition represents one or the other of the binary digits one and zero. Common examples of such binary system devices are conduction and non-conduction in an electron tube, opposite conditions of magnetic polarity in a magnet, or a perforation and the absence of a perforation in a tape.

It is frequently necessary to use, in information handling systems, instruments which respond to the characteristics of a signal such as its magnitude and not to the binary coded form of signal. For example, the movement of a pointer across a meter dial or the displacement of an electron beam in a cathode ray tube may be a variable dependent on the magnitude of a voltage or current signal. Thus, they may be used to provide direct representations of digitally encoded information where the signals applied have a magnitude proportional to the encoded information or are otherwise representative of it, i. e. are in analogue form. Since the signals from digital devices are usually in the form of positive and negative pulses or the presence or absence of pulses, digital signals are not suitable for driving an analogue device such as by deflecting an electron beam in a cathode ray tube.

Analogue voltages are utilized in cathode ray tube devices in which electron beam displacement is controlled by the amplitudes of voltages applied to the deflection plates. Electrostatic storage tubes are one form of such a device and are described in the book "High-Speed Computing Devices" by Engineering Research Associates, 1950, page 354. In order to read out stored information or write in new information in a storage tube, it is necessary to deflect the electron beam to the proper storage points on a dielectric target. The location of the desired storage points on the target is usually known as their address. At some initial stage, the address information or message which directs displacement of the electron beam to the proper location is in digital form. Therefore, conversion equipment is required to transform the digitally encoded message to an amplitude or analogue form which can be applied to the deflection plates of the tube.

Basic forms of digital to analogue converters are discussed in "High-Speed Computing Devices," cited above, at page 393. These utilize condenser charging and electromechanical systems. Other converter circuits have been devised for providing cathode ray tube deflection voltages. In these circuits, currents in a plurality of parallel resistors are added in accordance with a binary encoded message to provide an analogue output representative of the binary message. Circuits of this type are described in a report, "Project Whirlwind, Contract N5ori-60, Summary Report No. 2," 1947, volume 10, "Storage Tubes," Report R-120, section IV, "Decoding Circuits," Servomechanisms Laboratory, Massachusetts Institute of Technology. As discussed in this report, prior art, "current adding circuits" have several disadvantages: For reasonable values of supply voltage and power consumption, the output is small and at a high impedance level. Difficulties arise in providing voltage swings for switching control tubes on and off. Due to the interrelationship of currents in parallel circuit elements the circuit was found to be unreliable in that it was very unstable and the output was far from linear.

Accordingly, it is an object of this invention to provide a new code converter circuit useful with a cathode ray tube.

Another object is to provide a code converter circuit which is simple in operation and economical in construction.

Still another object of this invention is to provide a reliable code converter circuit for converting binary encoded messages to analogue voltages.

A feature of this invention is that no more than two voltage analogues are combined, and addition of currents is not necessary.

These and other objects of this invention are achieved in an exemplary embodiment described in detail below, wherein a binary encoded message having four bits (binary digits) is converted to sixteen different voltages with amplitudes representative of the sixteen different numbers or total permutations of the binary digits one and zero in the four-bit message. The term "permutation" is used throughout in the broad sense of all the ordered combinations of the binary digits. A register of four trigger circuits receives the four bits of the message. The highest order trigger circuit may be considered as representing $2^3$, and the other trigger circuits as representing $2^2$, $2^1$, and $2^0$ in the usual binary notation. A series of eight thyratrons having different anode resistors are used as switching elements. The anode resistors have different magnitudes: One is related in magnitude to $2^3$ and is associated with the $2^3$ trigger circuit, each of the other seven resistors is associated with and related in magnitude to a different one of the seven numbers formed by permutations of the digits registered in the other three trigger circuits. (Zero is represented by the absence of a voltage.) The grid of the thyratron having the $2^3$ anode resistor is coupled to the output of the $2^3$ trigger circuit, and that thyratron is fired when the associated trigger circuit registers the binary digit one. The other three trigger circuits are coupled to the grids of the other seven thyratrons through a converter matrix. Each of the other seven thyratrons are fired when the associated number is registered in the other three trigger circuits. The $2^3$ resistor is coupled to one of the deflection plates of a cathode ray storage tube. The other seven resistors in parallel are coupled to the opposing deflection plate. The net voltage produced at the deflection plates is the difference between that produced by any current flow in the $2^3$ resistor and that produced by current flow in one of the parallel resistors. In this way, sixteen different net voltages may be applied to the deflection plates, each representative of a different one of the sixteen numbers or permutations of the four-bit message.

The novel features of the invention as well as the invention itself may be best understood from the following description and the accompanying drawings in which.

Figure 1:
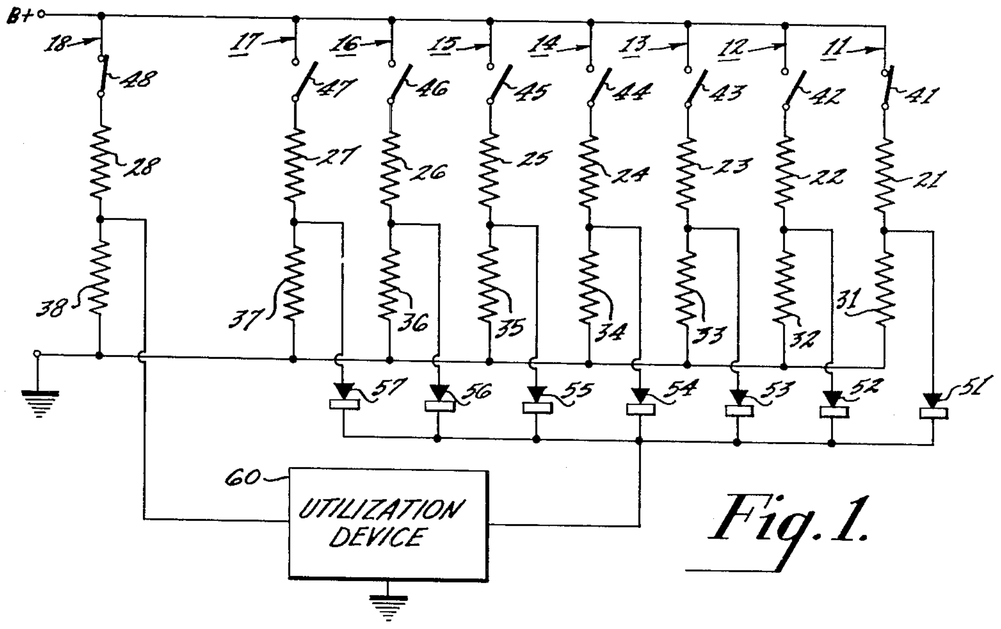
Figure 1 is a simplified schematic circuit diagram used to explain the invention.

Binary digital numbers or messages can be converted or translated into analogue voltages by means of the simplified circuit embodying the principles of this invention shown in Figure 1. This circuit, shown for purpose of illustration, may be used to convert a four-bit (binary digit) number or message to sixteen different analogue voltages each representative of a different one of the numbers or permutations possible in a four-bit number. Eight parallel voltage dividers, 11 through 18, are used, each having a first resistor 21 through 28, a second resistor 31 through 38, and a switch 41 through 48 in series. A regulated source of operating potential is applied across the voltage dividers. Output voltages are taken across the second resistor 31 through 37 in each of the first seven voltage dividers and are applied through blocking diodes, 51 through 57, isolating each divider, to a utilization device 60. An output voltage is also taken across the second resistor 38 of the eighth voltage divider 18 and applied to the utilization device 60. The utilization device 60 may be any device which algebraically adds or subtracts, directly or indirectly, voltages simultaneously applied to it, or which otherwise utilizes the pair of analogue voltages applied to it. As described in a specific embodiment below, a cathode ray tube having opposing deflection plates may be used. The divider switches 41 through 48 may be controlled by currents or voltages or pulses produced by means of a perforated or magnetic tape, or by trigger circuits, or any other means.

In a four-bit number, the three lower order digits represent eight different numbers including zero. These are represented in the following manner: The ratio of the resistance of the second resistor 31 in the first voltage divider 11 to the total resistance of the divider is made proportional to one. The resistance ratio in the second divider 12 is made proportional to two, and so on. Thus, the output voltage from each of the first seven dividers 11 through 17 is proportional to a different one of the numbers one through seven. Zero may be represented by zero voltage, and therefore, a zero divided is not needed. The resistance ratio in the eighth voltage divider 18 is made proportional to eight, which is $2^3$, the number represented by the digit in the fourth or highest order position of the message.

One of the switches 41 through 47 in the first seven dividers 11 through 17 is closed when the number it represents is formed by the three lower order digits of the message. For each number, other than zero, formed by the three lower order digits of the message, one and only one of the first seven switches 41 through 47 is closed. The switch 48 of the eighth divider 18 is closed when the fourth digit is a one, and remains open when it is a zero. For example, when the signal message has the form 1001 (the number 9 in decimal notation), the first voltage divider switch 41 and the eighth divider switch 48 are closed. This results in a pair of voltages respectively proportional to one and eight being applied to the utilization device 60 where they may be added, or otherwise combined, algebraically.

When the switch 48 of the eighth voltage divider 18 is open, the output of that divider is zero. This output may be paired with eight different possible voltages, including zero, produced by the first seven dividers. A pair of zero voltages are produced when all of the switches remain open, corresponding to a zero digit in each of the four bits of the message. Similarly, when the switch of the eighth voltage divider is closed, the voltage output proportional to eight from that divider may be paired with eight different voltages, including zero, produced by the first seven dividers. Thus, a total of sixteen different voltage pairs may be applied to the utilization device.

Each of the sixteen voltage pairs forms an analogue of one of the sixteen digital permutations of the four-bit signal message. Single voltage analogues of the digital message permutations may be provided in various ways. For example, voltages proportional to the numbers formed by the message may be produced by applying the voltage pairs to a voltage adding circuit such as described in the book "Waveforms," Radiation Laboratory Series, volume 19, 1949, chapter 18, Mathematical Operations on Waveforms. The utilization device 60 includes a voltage adding circuit under such circumstances.

Where proportional analogue voltages are not needed, it may suffice if sixteen different voltages (or other signal forms) are produced, each of which is somehow representative of a different one of the signal message permutations. This is the case in the cathode ray tube embodiment of this invention described below. Under such circumstances, the voltage pairs may be combined in any appropriate manner. For example, the difference may be taken between the two voltages of each pair by a subtracting circuit such as described in "Waveforms," cited above. As in the cathode ray tube, the utilization device itself may require a pair of voltages as inputs, in which case an initial combining of the voltages of each pair is not necessary. Where the voltage analogues need only be representative and not proportional, the voltage divider outputs may be of any convenient magnitude, not necessarily proportional to the numbers they represent. If the eight divider outputs are different, sixteen different voltage pairs are produced.

In the general circuit arrangement described above, no more than two voltages are combined at any time, and sixteen different pairs of voltages are produced by only eight different dividers. The invention is, of course, not restricted in its utility to converting a four-bit message. A circuit embodying this invention may be used to convert a binary message having any number of bits. For converting an $n$-bit message, the number of voltage dividers required is $2^{n-1}$; that is to say, half the number of permutations formed by an $n$-bit message. Due to the pairing (or combining) of the divider output voltages, the full $2^n$ analogue voltages (or other signal forms) are directly or indirectly produced.

This invention is not limited in its application to producing analogue voltages. It is apparent from the above description, that currents through a series of resistors may be drawn off as outputs and applied to a utilization device in a similar manner. Similarly, no more than two currents are combined at any time in the utilization device.

Figure 2:
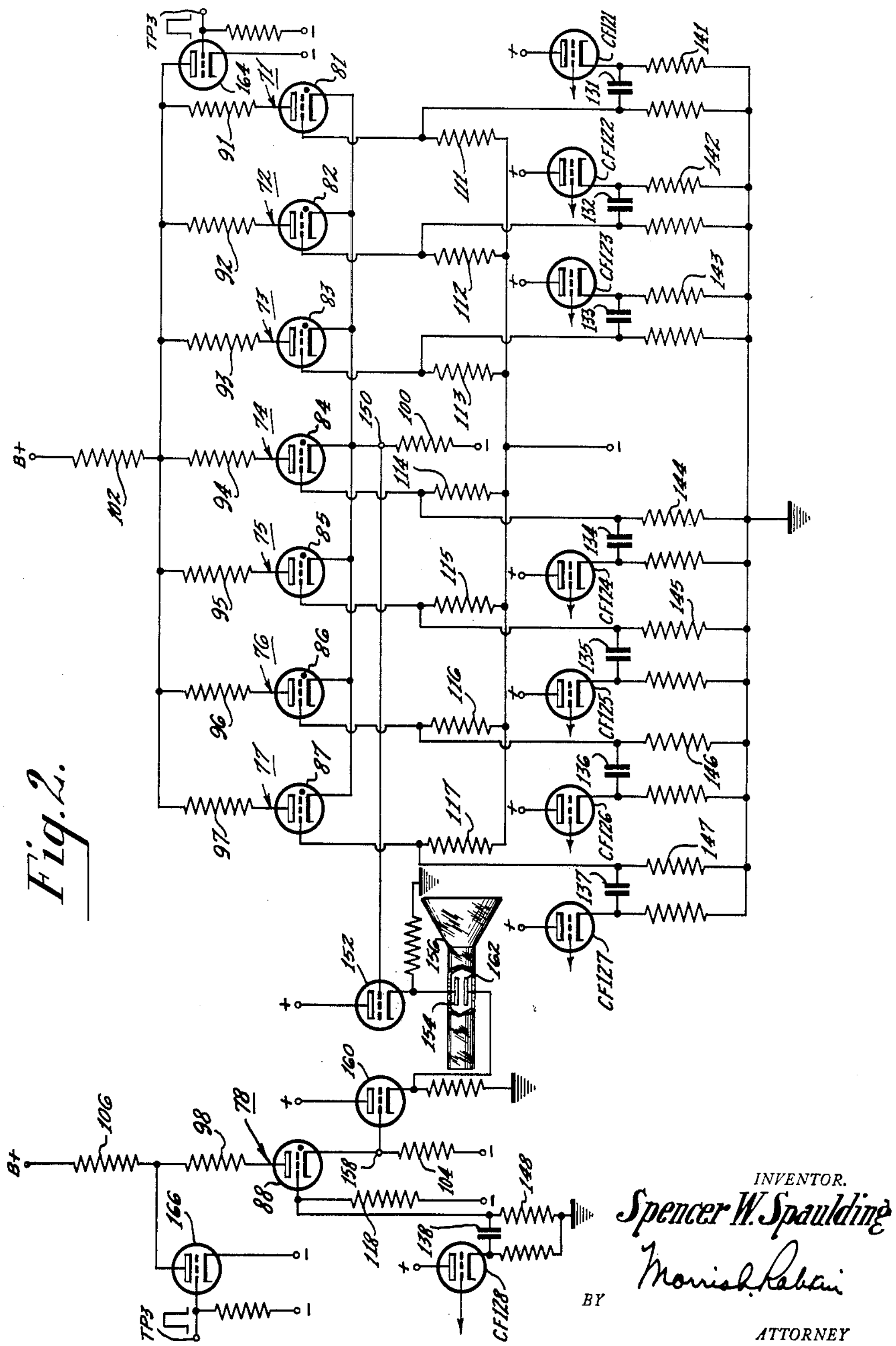
Figure 2 is a schematic circuit diagram of a code converter circuit embodying this invention.

Shown in Figure 2 is an embodiment of this invention for converting a four-bit binary encoded message to analogue voltages. Such voltages are suitable for deflecting the electron beam of a cathode ray tube of the type used in information handling systems for storage purposes. Eight voltage dividers 71 through 78 are set up as before. The first voltage divider 71 includes a grid controlled gas discharge tube 81, such as a thyratron, functioning as a switch, a first resistor 91 connected to the anode of the tube 81 and a common second resistor 100 connected to the cathode. Each of the second, third, . . . , seventh voltage dividers 72 through 77 similarly include a thyratron 82 through 87, a first resistor 92 through 97 connected to the anode of the tube and the common second resistor 100 connected to the cathode of the tube. A common load resistor 102 connects the first resistors 91 through 97 of each of the first seven dividers 71 through 77 to a source of operating potential. The eighth voltage divider 78 includes a gas tube 88, a first resistor 98 and a second resistor 104 respectively connected to the anode and the cathode of the tube 88, and a load resistor 106 at the first resistor 98 connecting the divider 78 to a source of operating potential. The grids of each of the eight gas tubes 81 through 88 are connected to a souce of negative biasing potential through different biasing resistors 111 through 118. Input signals are applied to the grids of each of the eight gas tubes through eight different cathode follower buffers 121 through 128 and differentiating networks, each consisting of a capacitor 131 through 138 and a resistor 141 through 148. The outputs from the first seven dividers 71 through 77 are taken at a terminal 150 at the common second resistor 100 and applied to the grid of a cathode follower 152. The output of this cathode follower 152 is applied to the upper electrostatic deflection plate 154 of a cathode ray tube 156. The output of the eighth voltage divider 78 is taken at a terminal 158 at the cathode of the eighth tube 88 and applied to the grid of another cathode follower 160. The output of this cathode follower 160 is applied to the lower deflection plate 162 of the cathode ray tube 156. The two output cathode followers 152, 160 are negatively biased through the second voltage divider resistors 100, 104.

Two negatively-biased, grid-controlled electron discharge tubes 164, 166 are used for extinguishing purposes. The anode of the first extinguishing tube 164 is connected to the source of operating potential through the common load resistor 102 of the first seven dividers 71 through 78. The second extinguishing tube 166 has its anode connected to B+ through the load resistor 106 of the eighth voltage divider 78.

In the standby condition, all of the tubes are cut off. The thyratron 88 of the eighth voltage divider 78 is fired when the $2^3$ digit of the signal message is a one, and it remains extinguished when that digit is a zero. This is done by the application of a positive potential to the tube grid of the eighth cathode follower 128 when the $2^3$ digit is a one, causing the cathode follower tube to conduct. The resulting voltage rise at the cathode of the cathode follower tube is differentiated and applied to the grid of the eighth thyratron 88 causing that tube to fire. Similarly, each of the thyratrons 81 through 87 in the first seven voltage dividers 71 through 77 is fired, under control of the proper one of the first seven cathode followers 121 through 127, when the number associated with that tube is formed by the three lower order digits of the four-bit signal message. The input circuitry for applying the proper tube grid potentials to the eight cathode followers is described below.

In each of the first seven voltage dividers 71 through 77, resistors are chosen such that the ratio of the resistance of the common second resistor 100 to the total resistance of each divider produces an output voltage at the output terminal 150 respectively proportional to one, two, . . . , seven. Similarly, the resistors in the eighth voltage divider 78 are chosen to provide an output voltage proportional to eight, in the manner described above.

The output voltages are applied to the deflection plates 154, 162 of the cathode ray tube 156 through the deflection plate cathode followers 152, 160 which can directly drive the deflection plates. The voltage output of the eighth voltage divider 78 is applied to the lower deflection plate 162 and may be considered positive. The voltage output of the first seven dividers 71 through 77, applied to the upper deflection plate 154, may be considered negative. Thus, sixteen different voltage pairs are applied to the deflection plates. Each voltage pair results in a different net voltage on the plates, so that sixteen different net voltages produce sixteen different electrostatic fields between the plates. The different electrostatic fields deflect the electron beam to sixteen different positions across the target of the tube, as summarized in the following table:

| Signal Message | Lower Plate Voltage | Upper Plate Voltage | Net Voltage | Beam-Target Position |
|---|---|---|---|---|
| 1000 | 8 | 0 | 8 | 1 |
| 1001 | 8 | 1 | 7 | 2 |
| 1010 | 8 | 2 | 6 | 3 |
| 1011 | 8 | 3 | 5 | 4 |
| 1100 | 8 | 4 | 4 | 5 |
| 1101 | 8 | 5 | 3 | 6 |
| 1110 | 8 | 6 | 2 | 7 |
| 1111 | 8 | 7 | 1 | 8 |
| 0000 | 0 | 0 | 0 | 9 |
| 0001 | 0 | 1 | −1 | 10 |
| 0010 | 0 | 2 | −2 | 11 |
| 0011 | 0 | 3 | −3 | 12 |
| 0100 | 0 | 4 | −4 | 13 |
| 0101 | 0 | 5 | −5 | 14 |
| 0110 | 0 | 6 | −6 | 15 |
| 0111 | 0 | 7 | −7 | 16 |

The beam is undeflected and positioned in the center of the target when the signal message bits are all zeroes, and it is deflected to an extreme lower position, the "1" position, when only the highest order digit is a one. The other signal message permutations result in different beam deflections above the "1" position. Thus, there is a distinct one-to-one correspondence between each of the net voltages or each of the target positions and a different one of the signal message permutations.

The analogues of the binary signal message permutations are only broadly representative, rather than directly proportional to the binary numbers. Therefore, the voltage divider outputs need not be strictly proportional, as described above. The voltage divider resistors may be chosen to provide output voltages of any appropriate magnitude provided they are different.

After the electron beam has been in its deflected position on the target for a predetermined time, positive timing pulses are applied to the grids of the extinguishing tubes 164, 166 causing them to conduct. These tubes 164, 166 draw current through the common load resistor 102 of the first seven dividers and through the load resistor 106 of the eighth divider. The plate potentials of all thyratrons are thereby reduced below the extinction potential, and the conducting thyratrons are extinguished. The circuit is then in condition to convert the next signal message.

The invention may also be applied to a cathode ray tube utilizing coils as electromagnetic deflection elements. The currents in eight different resistor circuits (corresponding to the eight voltage dividers) are used as the outputs. Current flow in one of the first seven parallel circuits is applied to one of the deflection coils in series with each of these circuits, and current flow in the eighth circuit is applied to the other opposing deflection coil in series with the eight circuit. In such an embodiment, the output current pairs produce different electromagnetic deflecting fields, and the results are similar to those described for the electrostatic cathode ray tube.

Figure 3:
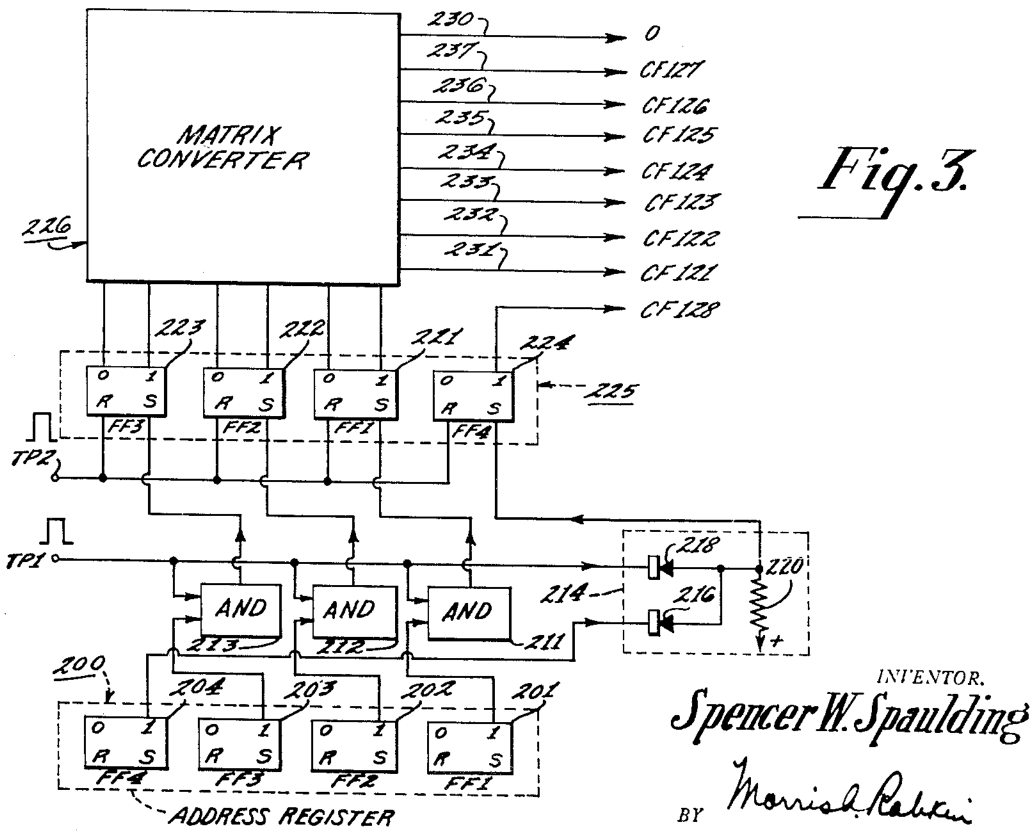
Figure 3 is a schematic block diagram of input circuitry for the code converter circuit of Figure 2.
Figure 4:
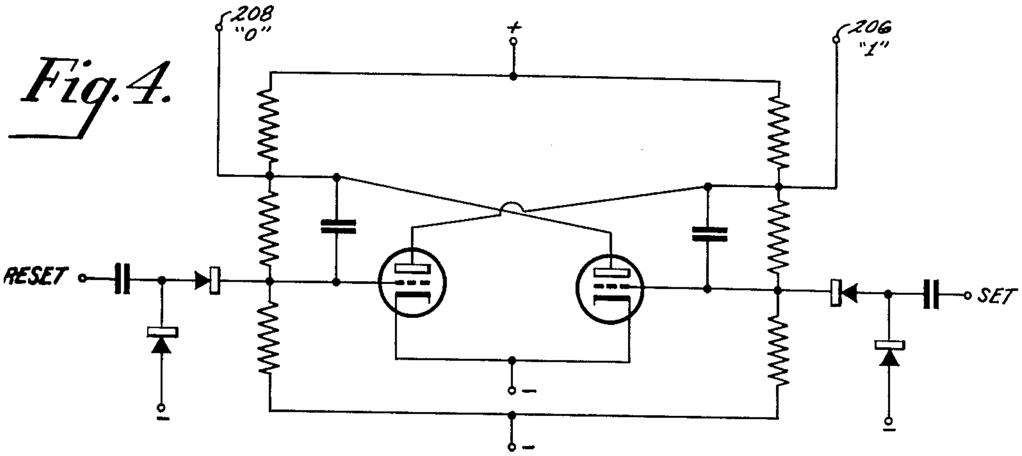
Figure 4 is a schematic circuit diagram of a trigger circuit utilizable in the block diagram of Figure 3.

A general arrangement of input circuitry appropriate for selecting the thyratrons to be fired in accordance with a signal message is shown in Figure 3. The input circuitry, as such, does not form a part of this invention. The original message, which may be taken from a storage device, such as magnetic tape, in pulse form, is entered into an address register 200 where it is converted to static potential levels. The address register may be made up of first, second, third and fourth trigger circuits 201, 202, 203, 204, shown as boxes. One form of trigger circuit that may be used is the Eccles-Jordan bistable multivibrator, commonly called the flip-flop, and discussed in "High-Speed Computing Devices," cited above, at page 12. A suitable flip-flop circuit is shown in Figure 4, and is made up of a pair of tubes having cross-coupled anodes and control grids. The flip-flop has two stable states and two different levels of anode potential are produced. When a binary digit one is stored in the flip-flop, i. e. when it is "set," the right-hand tube is conducting and the left-hand tube cut off. The anode of the right-hand tube is at a low potential, and the left-hand tube anode is at high potential. The opposite condition exists when a zero is stored in the flip-flop, i. e. when it is "reset." Thus, the "1" output (right-hand output) 206 of the flip-flop is at high potential, and the "0" output (left-hand output) 208 is at low potential when a one is stored.

The "1" outputs of the first, second, third and fourth address register flip-flops 201, 202, 203, 204 are respectively connected to one of the two inputs of first, second, third and fourth "and," or coincidence circuits 211, 212, 213, 214, shown as boxes. The other of the inputs of each "and" circuit receives a first positive timing pulse $TP_1$. A common form of "and" circuit which is appropriate is shown within the broken line box of the fourth "and" circuit 214. It is made up of a pair of diodes 216, 218, the cathodes of which receive input signals, and the anodes of which have a source of operating potential applied to them through a load resistor 220. If current is drawn through either one of the diodes, the anode end of the load resistor is at a low potential. If positive potentials are applied simultaneously to the diode cathodes, current flow through the load resistor 220 is blocked and the potential at the anode end rises. Outputs are taken at the anode end of the load resistor.

The outputs of the first, second third and fourth "and" circuits 211, 212, 213, 214 are respectively applied to the set sides of first, second, third and fourth flip-flops 221, 222, 223, 224, which form a converter register 225. The reset sides of these flip-flops receive a second set of positive timing pulses $TP_2$. The first three flip-flops 221, 222, 223 of the converter register 225 have their outputs coupled to a matrix converter 226. The matrix converter has eight output leads 230 through 237, each corresponding to a different one of the eight different numbers or permutations (including zero) registered in the first three converter flip-flops. The first 230 of the converter output leads corresponds to the number zero and is not needed. The other seven output leads 231 through 237 are respectively connected to the grids of the first seven thyratron-driving cathode followers 121 through 127. The fourth one 224 of the flip-flops has its "1" output connected to the grid of the eighth thyratron-driving cathode follower 128.

Figure 5:
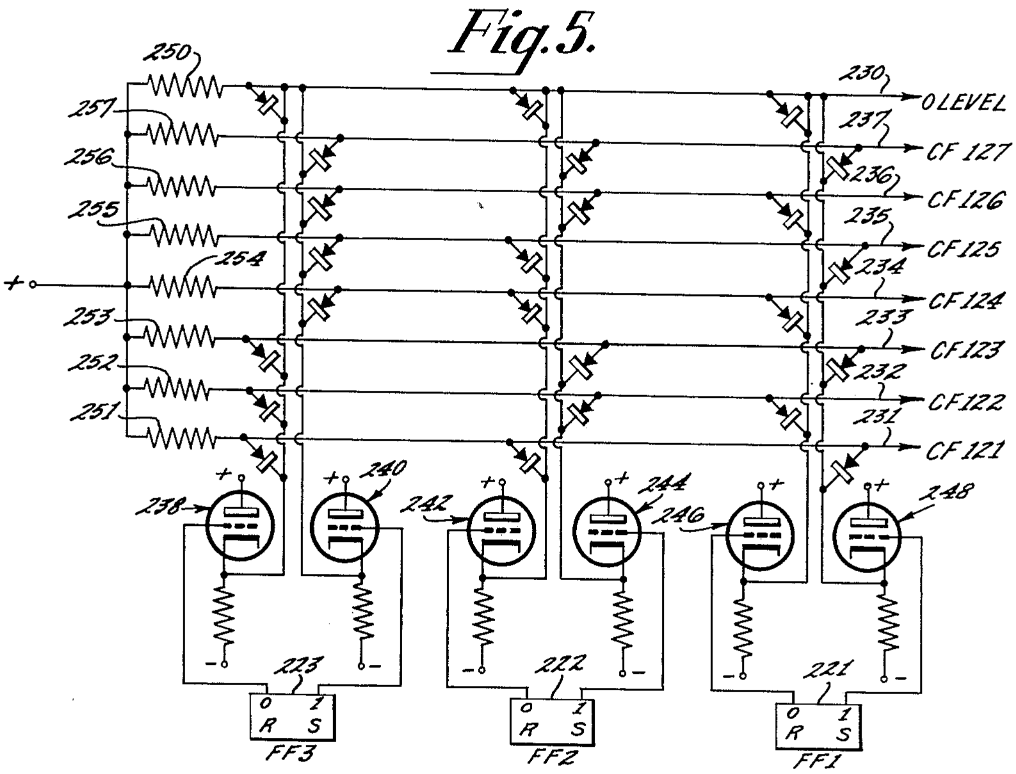
Figure 5 is a schematic circuit diagram of a matrix converter circuit utilizable in the block diagram of Figure 3.

The matrix converter 226 may be of any type suitable for translating the binary form of information stored in the converter register flip-flops 221, 222, 223 to octal form. One such matrix converter is described in High-Speed Computing Devices, cited above, at page 42 and is shown in Figure 5.

Each of the first three converter flip-flops 221, 222, 223 has its "1" and "0" outputs respectively connected to the grid of "1" and "0" cathode follower buffers, 238, 240, 242, 244, 246, 248. The cathodes of the "1" cathode followers 240, 244, 248 rise in potential when the "1" outputs of the flip-flops are high; and the cathodes go low when the "1" outputs of the flip-flops are low. Similarly, potential changes take place at the cathodes of the "0" cathode followers 238, 242, 246 corresponding to potential changes at the "0" outputs of the flip-flops.

Each of the eight output leads 230 through 237 of the matrix converter are connected to a different load resistor 250 through 257. The load resistors are connected to a source of operating potential. Each of the output leads is also coupled to the three converter flip-flops 221, 222, 223 through three diodes and one of the two cathode followers isolating each flip-flop. The voltage level at each output lead is high only when current flow is blocked in the load resistor to which it is connected. This occurs only when all three of the diodes connected to an output lead are blocked by being coupled to high potential levels. The diode connections shown in Figure 5 are arranged to produce a high potential level at only one of the output leads for each binary number registered in the three converter flip-flops. For example, when a zero is stored in each of the three flip-flops the cathode of each "0" cathode follower 238, 242, 246 is high. This prevents the three diodes connected to the zero output lead 230 from conducting, which in turn blocks current flow in the zero load resistor 250. Therefore, the zero output lead 230 is at high potential. Each of the other output leads has at least one of the diodes connected to a "1" cathode follower, the cathodes of which are at low potential. Thus, there is current drawn through each of the other load resistors by way of at least one diode, and the other seven output leads are accordingly at low potential. When a one is stored in each of the flip-flops (the binary form of decimal number seven), the cathodes of the "1" cathode-followers 240, 244, 248 are all high, and current flow is blocked in the number seven load resistor 257, and the number seven output load 237 is at high potential. Similarly, each of the other output leads is placed at high potential when the associated number is stored in digital form in the converter flip-flop register. The zero output lead 230 is dispensed with in this application, since it is not utilized.

The operation of the input circuitry and the code converter is now described. Initially, all of the flip-flops are in reset condition. The four-bit signal message which determines the deflection of the electron beam in the cathode ray tube is received by the address register 200. The first or lowest order binary digit is entered in the first flip-flop 201, the second digit in the second flip-flop 202, and so on. When the digits are entered, a first positive timing pulse is applied to each of the "and" circuits 211, 212, 213, 214. If a one is stored in any of the address register flip-flops, the associated "and" circuit produces a positive output pulse. The "and" circuit output pulses set the associated flip-flops of the converter register, so that these four flip-flops 221, 222, 223, 224 then hold the original binary message.

If the fourth digit is one, the fourth flip-flop 224 is set, a positive grid voltage is applied to the tube grid of the eighth thyratron-driving cathode follower 128, and the eighth thyratron 88 is fired. If the fourth digit is a zero, the fourth flip-flop remains reset, and the eighth thyratron remains extinguished.

The set and reset conditions of the first three converter flip-flops 221, 222, 223 produce a voltage rise at only one of the output leads of the matrix converter 226 and at the tube grid of the cathode follower connected thereto, which results in the firing of the associated thyratron. If the first three digits of the signal message are zeroes, none of the first seven thyratrons are fired.

Figure 6:
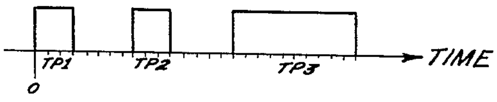
Figure 6 is a timing diagram of the occurrence of timing pulses.

After the thyratrons are fired a second positive timing pulse resets the four flip-flops of the converter register, preparing them for the next signal message. This also has the effect of returning the grids of all the thyratron-driving cathode followers to a negative cut-off potential. After the electron beam of the cathode ray tube has been deflected for an appropriate length of time, a third positive timing pulse is applied to the extinguishing tubes 164, 166 causing them to conduct and extinguish any of the thyratrons that were fired. The input and code converter circuitry is then in condition to receive the next signal message and repeat the cycle. The time order of application of the three timing pulses is shown in Figure 6.

A circuit embodying this invention, which is based on using voltage analogues, does not depend in any way on constant current devices. Furthermore, no more than two voltage analogues are added to produce a net analogue of the signal message. Consequently, any cumulative errors are minimized in the circuit. Fidelity in the output depends on regulating the voltage supply, constancy of thyratrons voltage drop with specified loading, constancy of resistances, and maintaining cathode follower gain. Any shifts in these parameters will most likely be slow drifts and by proper relationship in the storage tube, they will be cancelled out. The thyratrons have low impedance, and since the divider currents are essentially determined by divider resistance, the system is substantially unaffected by changes in thyratron characteristics.

It is, therefore, apparent from the above description that a simple coded converter circuit which is economical and reliable is provided, and it has special utility when used with cathode ray storage devices.

What is claimed is:

1. A code converter circuit for converting binary encoded signal messages, formed by permutations of $n$ signals of either of two types corresponding to permutations of $n$ binary digits, to different magnitude signals each representative of a different permutation of said binary digits, said circuit comprising a plurality of impedance elements having different impedance magnitudes, one of said impedance elements being associated with one of said digits, each of the others of said impedance elements being associated with a different permutation of the others of said digits, switch means responsive to a signal representing said one digit for controlling current flow in said one impedance element, additional switch means for controlling current flow in each of said other impedance elements in response to signals representing the associated permutation of said other digits, a first output terminal coupled to said one impedance element, a second output terminal coupled to said other impedance elements in parallel, and means coupled between said output terminals for algebraically combining output signals produced at said first and second output terminals.

2. A code converter circuit as recited in claim 1 wherein said algebraic combining means includes a cathode ray tube having a pair of opposing deflection elements, one of said deflection elements being coupled to said first output terminal, the other of said deflection elements being coupled to said second output terminal whereby electron beam displacement in said cathode ray tube produced by said deflection elements is representative of said encoded signal messages.

3. A code converter circuit for converting binary encoded signal messages, formed by permutations of $n$ signals of either of two types corresponding to permutations of $n$ binary digits, to different magnitude signals each representative of a different permutation of said binary digits, said circuit comprising a binary register having $n$ register elements each associated with and receiving a different one of said signals and having one of two different states determined by the type of signal received thereby, a plurality of impedance elements having different impedance magnitudes, switch means responsive to the state of one of said register elements for controlling current flow in one of said impedance elements, additional switch means responsive to permutations of the states of the others of said register elements for controlling current flow in the others of said impedance elements, an output terminal coupled to said one impedance element, a second output terminal coupled to said other impedance elements in parallel, and means coupled between said output terminals for combining an output at said one terminal with an output at said second terminal.

4. A code converter circuit for converting binary encoded signal messages, formed by permutations of $n$ signals of either of two types corresponding to permutations of $n$ binary digits, to different magnitude signals each representative of a different permutation of said binary digits, said circuit comprising $2^{n-1}$ impedance elements, one of said impedance elements being associated with one of said digits and having an impedance magnitude representative of the permutation position thereof, each of the others of said impedance elements being associated with a different permutation of the others of said digits and having an impedance magnitude representative of the associated permutation, switch means responsive to a signal corresponding to said one digit for controlling current flow in said one impedance element, additional switch means for controlling current in each of said other impedance elements responsive to signals representing the associated permutations of said other digits, an output terminal coupled to said one impedance element, a second output terminal coupled to said other impedance elements in parallel, and means coupled between said output terminals for algebraically combining output signals produced at said first and second terminals.

5. A code converter circuit is recited in claim 4 wherein each of said switch means includes a grid-controlled electron tube.

6. A code converter circuit as recited in claim 4 wherein said one of said digits is in the highest order permutation position, and said one of said impedance elements has the lowest impedance magnitude.

7. A code converter circuit comprising a series of $n$ digital elements representing different powers of the integer two for registering numbers in the binary notation system, each of said digital elements having two different states and producing two different signals each representative of a different one of said states, $2^{n-1}$ impedance elements, one of said impedance elements being associated with one of said digital elements and having an impedance magnitude corresponding to the power of two represented by said one digital element, each of the others of said impedance elements being associated with a different permutation of the states of the others of said digital elements and having an impedance magnitude corresponding to the number represented by the associated permutation, switch means coupled to said one digital element and responsive to the state thereof for controlling current flow in said one impedance element, a different switch means coupled to each of said other impedance elements, each of said different switch means being coupled to said other digital elements and responsive to the associated permutation of states thereof for controlling current flow in the impedance element coupled thereto, an output terminal coupled to said one impedance element, and a second output terminal coupled to said other impedance elements in parallel.

8. A code converter circuit for applying voltages to opposing deflection plates of a cathode ray tube in accordance with binary encoded signal messages formed by permutations of $n$ signals of either of two types corresponding to permutations of $n$ binary digits, said circuit comprising $2^{n-1}$ voltage dividers, one of said voltage dividers being associated with one of said digits, each of the others of said voltage dividers being associated with a different permutation of the others of said digits, each of said voltage dividers including an electron tube and a resistor, means for changing the conductive state of the tube in said one voltage divider in response to a signal representing said one digit, means for changing the conductive state of each of the tubes in said other voltage dividers in response to a signal representing the associated permutation of said other digits, means for coupling said one voltage divider to one of said deflection plates, and means for coupling said other voltage dividers in parallel to the other of said deflection plates.

9. A code converter circuit as recited in claim 7 wherein each of said electron tubes are grid-controlled gas discharge tubes.

10. A code converter circuit for applying voltages to opposing deflection plates of a cathode ray tube in accordance with binary encoded signal messages formed by permutations of $n$ signals of either of two types corresponding to permutations of $n$ binary digits, said circuit comprising a first, a second, . . . , a $2^{n-1}$ resistor element, said $2^{n-1}$ resistor element being associated with a digit in the highest order permutation position of said messages and having a resistance magnitude representative of said position, each of the others of said resistor elements being associated with a different permutation of the others of said digits and having a resistance magnitude representative of the associated permutation, a first, a second, . . . , a $2^{n-1}$ grid-controlled electron tube respectively coupled to said first, second, . . . , $2^{n-1}$ resistor for controlling current flow therethrough, means responsive to a signal corresponding to said highest order digit for applying a tube-conductive voltage to the grid of said $2^{n-1}$ tube, means responsive to a signal corresponding to a permutation of said other digits for applying a tube-conductive voltage to the grid of the associated one of said tubes, means for coupling said $2^{n-1}$ tube to one of said deflection plates, and means for coupling the other of said tubes in parallel to the other of said deflection plates.

11. A code converter circuit for applying voltages to opposing deflection plates of a cathode ray tube, said circuit comprising a series of $n$ digital elements representing different powers of the integer two for registering numbers in the binary notation system, $2^{n-1}$ resistor elements, one of said resistor elements being associated with one of said digital elements and having a resistance magnitude corresponding to the power of two represented by said one digital element, each of the others of said resistor elements being associated with a different one of the numbers registered in the others of said digital elements and having a resistance magnitude corresponding thereto, a different grid-controlled electron tube coupled to each of said resistors, said one digital element being coupled to the grid of the tube coupled to said one resistor element, a circuit for converting from binary radix to $2^{n-1}$ radix coupled between said other digital elements and the grids of the others of said tubes, said one resistor element being coupled to one of said deflection plates, said other resistor elements in parallel being coupled to the other of said deflection plates, and means for terminating conduction in all of said tubes.

12. A code converter circuit for converting binary encoded signal messages, formed by permutations of $n$ signals of either of two types corresponding to permutations of $n$ binary digits, to different magnitude signals representative of different permutations of said binary digits, said circuits comprising a first, a second, . . . , a $2^{n-1}$ grid-controlled gas discharge tube having an anode, a cathode and a control grid, a first, a second, . . . , a $2^{n-1}$ resistor respectively coupled to the anode of said first, second, . . . , a $2^{n-1}$ tube, said $2^{n-1}$ resistor being associated with a digit in the $2^n$ permutation position of said messages and having a resistive magnitude representative thereof, each of the others of said resistors being associated with a different permutation of the others of said digits and having a resistance magnitude representative thereof, a first cathode resistor connected to the cathode of said $2^{n-1}$ tube, a common cathode resistor connected to the cathodes of the others of said tubes, signal responsive means for terminating conduction in all of said tubes, means for taking an output at said first cathode resistor, and means for taking an output at said common cathode resistor.

13. A code converter circuit for converting encoded signal messages, formed by permutations of $n$ signals of a plurality of types corresponding to number permutations of $n$ digits of a plurality of types each corresponding to a different one of said signal types, to different magnitude signals each representative of a different one of said number permutations, said circuit comprising a plurality of impedance elements, one of said impedance elements being associated with one of said digits and having an impedance magnitude representative of the permutation position of said one digit, each of the others of said impedance elements being associated with a different permutation of the others of said digits and having a different impedance magnitude representative of the associated permutation of said other digits, switch means responsive to a signal corresponding to said one digit for controlling current flow in said one impedance element, additional switch means for controlling current flow in each of said other impedance elements responsive to signals corresponding to the associated permutations of said other digits, a first output terminal coupled to said one impedance element, a second output terminal coupled to said other impedance elements, and means coupled to both of said output terminals for combining signals appearing thereat.

References Cited in the file of this patent

UNITED STATES PATENTS

| | | |
|---|---|---|
| 2,458,030 | Rea | Jan. 4, 1949 |
| 2,505,029 | Carbrey | Apr. 25, 1950 |
| 2,533,242 | Gridley | Dec. 12, 1950 |
| 2,629,843 | Berry | Feb. 24, 1953 |
| 2,658,943 | Durkee | Nov. 10, 1953 |